US008214292B2

(12) United States Patent
Duggal et al.

(10) Patent No.: US 8,214,292 B2
(45) Date of Patent: Jul. 3, 2012

(54) POST-AUTHORIZATION MESSAGE FOR A FINANCIAL TRANSACTION

(75) Inventors: Chanderpreet Singh Duggal, Phoenix, AZ (US); Kristin R. Hoyne Gomes, Fenton, MO (US); Peter Georger Harris, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 300 days.

(21) Appl. No.: 12/416,680

(22) Filed: Apr. 1, 2009

(65) Prior Publication Data

US 2010/0257096 A1 Oct. 7, 2010

(51) Int. Cl.
*G06Q 40/00* (2012.01)
*G06F 17/30* (2006.01)

(52) U.S. Cl. ............ 705/44; 705/39; 707/E17.005; 707/E17.044

(58) Field of Classification Search ............ 705/44
See application file for complete search history.

(56) References Cited

U.S. PATENT DOCUMENTS

| 5,812,668 | A | * | 9/1998 | Weber | 705/79 |
|---|---|---|---|---|---|
| 5,850,446 | A | * | 12/1998 | Berger et al. | 705/79 |
| 5,949,045 | A | * | 9/1999 | Ezawa et al. | 235/379 |
| 5,996,076 | A | * | 11/1999 | Rowney et al. | 713/156 |
| 6,029,154 | A | * | 2/2000 | Pettitt | 705/44 |
| 6,160,874 | A | * | 12/2000 | Dickerman et al. | 379/114.19 |
| 7,051,002 | B2 | * | 5/2006 | Keresman et al. | 705/44 |
| 2002/0052852 | A1 | * | 5/2002 | Bozeman | 705/64 |
| 2002/0174065 | A1 | * | 11/2002 | Coward | 705/39 |
| 2002/0188573 | A1 | * | 12/2002 | Calhoon | 705/64 |
| 2003/0120615 | A1 | * | 6/2003 | Kuo | 705/78 |
| 2004/0167854 | A1 | * | 8/2004 | Knowles et al. | 705/41 |
| 2008/0275821 | A1 | * | 11/2008 | Bishop et al. | 705/64 |

OTHER PUBLICATIONS

Nancy Paradis, "Mail order company returns money series: Action: Recalls," St. Petersburg Times, Jun. 11, 2001,p. 2D.*
Peter Lucas, "New cosbatants in the e-check wars: tired of watching the explosion in electronic check volume getting routed through the ACH, Visa and EFT networks," Credit Card Management, v. 15, n. 12, p. 24.*
"Card Processing and management," Credit Management; Oct. 1998: p. 23.*

* cited by examiner

*Primary Examiner* — Elizabeth Rosen
*Assistant Examiner* — Joan Goodbody
(74) *Attorney, Agent, or Firm* — Snell & Wilmer L.L.P.

(57) ABSTRACT

Embodiments of the present invention provide a method and system for enabling a financial institution to communicate with a merchant regarding post-authorization processing of a financial transaction. The merchant assesses feasibility of the financial transaction after receiving an authorization from the financial institution for the financial transaction and accordingly processes the financial transaction based on the feasibility assessment. The processing of the financial transaction may either result in fulfillment or non-fulfillment of the financial transaction depending on the feasibility assessment. Finally, the merchant provides the financial institution details related to the processing of the financial institution in real-time following the authorization.

13 Claims, 3 Drawing Sheets

POST-AUTHORIZATION MESSAGE FOR A FINANCIAL TRANSACTION

BACKGROUND

1. Field

Embodiments of the present invention generally relate to financial transactions, particularly to post-authorization processing of the financial transactions.

2. Background Art

Financial transactions that use debit cards, credit cards and other similar cashless methods of purchasing products are increasingly becoming popular. In a cashless financial transaction, a consumer provides his/her card details to a merchant while placing a purchase order. The merchant then sends an authorization request including these details to a financial institution for seeking an authorization of the financial transaction. The financial institution makes a decision whether to authorize the merchant for carrying out the transaction, and transmits it to the merchant for execution. The merchant is then authorized to process or fulfill the purchase order. However, even when authorization is received from the financial institution, the merchant has a right to not process the purchase order for several reasons, such as stock limitations with the merchant, high fraud risk, order-timeline problems, and the like. Therefore, in any of such cases, the merchant may not process the purchase order, even though it is authorized by the financial institution.

Presently, the financial institution is informed about the completion of the financial transaction through the submission of a payment request made by the merchant corresponding to various financial transactions that the merchant has fulfilled in a given time frame. Transactions which were not completed, even if authorized, are not included in the payment request. The financial institution does not know that the transaction was not completed until the authorizations provided in the given time frame are reconciled with the payment request submitted by the merchant. Further, the financial institution is unaware of the reason for non-fulfillment of the financial transaction.

BRIEF SUMMARY

A method, a system and a computer program product for enabling a financial institution to communicate with a merchant regarding post-authorization processing of a financial transaction are provided. The financial institution is informed of post-authorization processing of the financial transaction in real time, and so obtains real-time awareness of the reason for the non-fulfillment of the financial transaction. Additionally, risk assessment for authorizing future financial transactions based on real-time awareness of the reason for the non-fulfillment of the financial transactions may be improved.

A method, a system and a computer program product for enabling the financial institution to communicate with the merchant through a communication channel regarding post-authorization processing of the financial transaction are provided. The merchant performs a feasibility assessment of the financial transaction after receiving an authorization for the financial transaction by the financial institution. Accordingly, the merchant may decide not to fulfill the purchase order based on the feasibility assessment due to several reasons, such as stock limitations, high fraud-risk, and the like. The merchant then provides the financial institution details related to processing of the financial transaction including information related to the feasibility assessment such as cause for the non-fulfillment. The details are sent to the financial institution through the same communication channel in real-time following the authorization by the financial institution.

In accordance with various embodiments of the present invention, the system may be embodied in the form of a computer program product. The computer program product instructs the system to receive and process the post-authorization details from the merchant.

BRIEF DESCRIPTION OF THE DRAWINGS/FIGURES

The features and advantages of the present invention will become more apparent from the detailed description set forth below, when taken in conjunction with the drawings, in which similar reference numbers indicate identical or functionally similar elements. Additionally, the left-most digit of a reference number identifies the drawing in which the reference number first appears.

DETAILED DESCRIPTION OF THE INVENTION

I. Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an exemplary embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

A method, a system and a computer program product are provided for enabling a financial institution to receive a post-authorization message from a merchant regarding post-authorization processing of a financial transaction. The merchant assesses feasibility of the financial transaction after receiving an authorization from the financial institution for the financial transaction based on card details. The authorization is received by the merchant through a communication channel. The merchant then processes the financial transaction based on the feasibility assessment. The processing of the financial transaction may result in either fulfillment or non-fulfillment of the financial transaction depending on the feasibility assessment. Accordingly, the merchant informs the financial institution regarding the processing of the financial transaction in real-time through the same communication channel.

In accordance to various embodiments, the present invention may be embodied in the form of a computer program product. The computer program product instructs the system to receive and process the post-authorization message.

II. System

Figure 1:
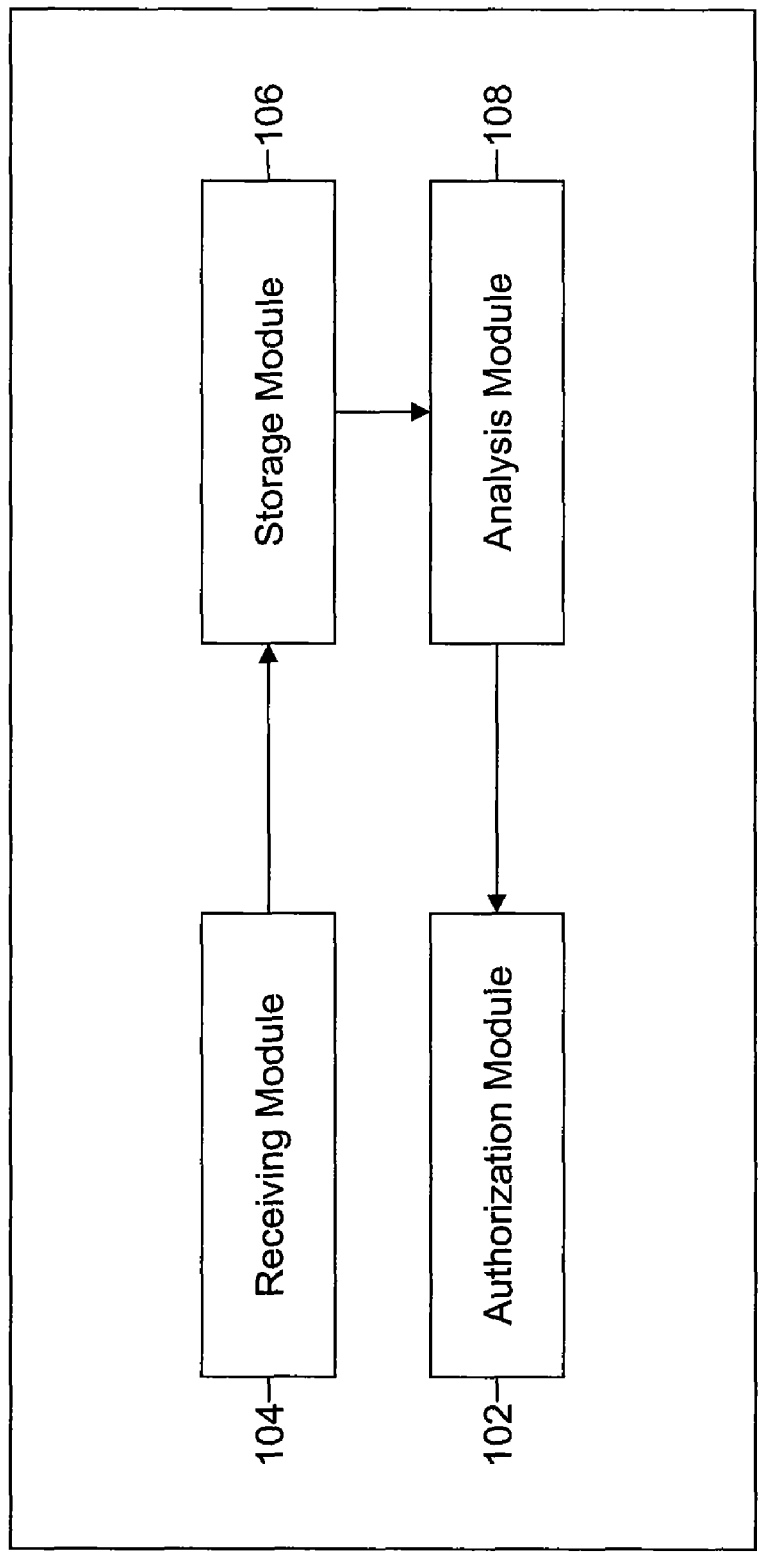
FIG. 1 is a block diagram of an exemplary architecture of a system, in accordance with an embodiment of the invention.

FIG. 1 is a block diagram of an exemplary architecture of a system 100, in accordance with an embodiment of the invention. In an embodiment of the invention, system 100 enables a financial institution to communicate with a merchant regarding the processing of a financial transaction. System 100 includes an authorization module 102, a receiving module 104, a storage module 106 and an analysis module 108.

Authorization module 102 is configured to authorize a merchant for processing a financial transaction corresponding to a purchase order. The purchase order is placed with the merchant through various means described in detail in conjunction with FIG. 2.

Authorization module 102 receives an authorization request from the merchant for executing the financial transaction for the purchase order (e.g., an order placed online, or a purchase requested at a point of sale). The authorization request includes details such as credit card details, purchaser details, etc., related to the financial transaction. Authorization module 102, thereby, processes the authorization request based on the details and makes a decision to authorize the merchant to take a particular action. For example, the authorization decision may be an approval, a decline, or a request for the merchant to call the financial institution for further information. The authorization decision is then transmitted to the merchant through a communication channel.

It must be understood that the means for placement of order and the communication channel for the authorization request may vary without limiting the scope of the present invention.

After receiving the authorization decision, the merchant processes the financial transaction and accordingly sends a post-authorization message in real-time to the financial institution. Receiving module 104 of system 100 is configured to receive the post-authorization message from the merchant. The post-authorization message contains details related to the processing of the financial transaction. The post-authorization message is received by the financial institution through the same communication channel as used for sending the authorization decision by the financial institution. In an embodiment of the invention, the details related to the processing of the financial transaction may also include information related to a feasibility assessment of the financial transaction. For example, the post-authorization message sent by the merchant may indicate that the financial transaction related to the purchase order was not fulfilled due to high fraud risk. The message may also include the credit card details and the purchase order information. The process of generating the post-authorization message is described in detail in conjunction with FIG. 2.

Storage module 106 is configured to store details related to the processing of the financial transaction, including the information related to the feasibility assessment of the financial transaction. In an embodiment of the present invention, the details also include a reason for non-fulfillment of the financial transaction. These details are stored by storage module 106 for later use in future authorization requests. In an embodiment of the present invention, storage module 106 may be embodied in the form of a database. The database maintains the details including the information related to the feasibility assessment, which may be updated based on post-authorization messages.

Analysis module 108 is configured to analyze the details stored in storage module 106 based on feasibility assessments of the financial transactions. In various embodiments of the present invention, analysis module 108 uses the analysis for financial risk assessment and provides this analysis to authorization module 102 for processing corresponding requests for authorization.

III. Process

Figure 2:
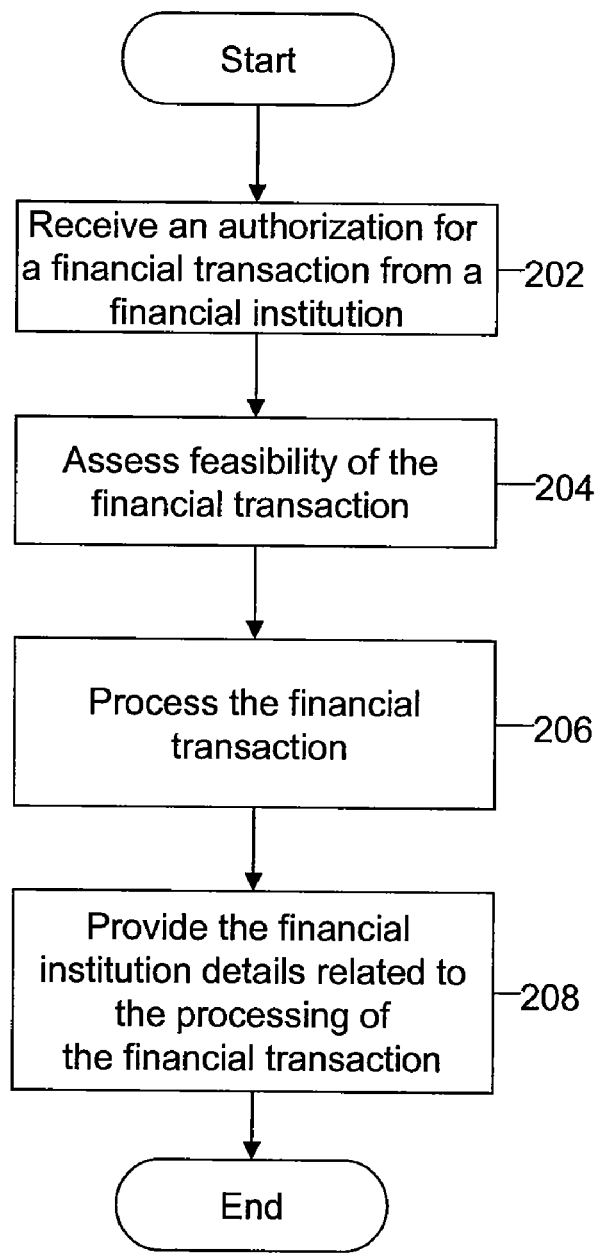
FIG. 2 is a flowchart illustrating a process for informing a financial institution regarding processing of a financial transaction, in accordance with an embodiment of the invention.

FIG. 2 is a flowchart illustrating a process 200 for informing a financial institution regarding processing of a financial transaction, after receiving an electronic authorization from the financial institution to carry out the transaction. At step 202, a merchant receives an authorization for the financial transaction from the financial institution. At step 204, the merchant assesses a feasibility of the financial transaction. At step 206, the merchant processes the financial transaction. At step 208, the merchant provides the financial institution details related to the processing of the financial transaction.

At step 202, the merchant receives the electronic authorization for the financial transaction from the financial institution through a communication channel associated with, for example, a computer based merchant authorization system. The authorization received from the financial institution authorizes the merchant to execute the financial transaction and fulfill a purchase order. In accordance with various embodiments of the invention, the purchase order represents a group of products or services requested by the consumer for purchase. The purchase order may be an internet order, mail order, telephone order, and the like. The purchase order may also include a request for purchase made at a point-of-sale terminal of a brick-and-mortar establishment.

The merchant may receive the electronic authorization from the financial institution by using any online or offline method of communication, such as with the help of an internet, a telephone, a handheld device, and the like. The method for receiving the authorization does not anyhow limit the scope of the present invention. The authorization may contain details, such as consumer name, consumer account number, merchant identifier, amount of the financial transaction, an order number, and an approval for the financial transaction. The financial transaction is, however, considered declined if the financial institution denies the merchant from executing the financial transaction. Typically, the process will be terminated without the need of any further steps, although, in an embodiment, a merchant may choose to submit a transaction that was not authorized by the financial institution regardless of the decision received from the financial institution.

At step 204, the merchant assesses the feasibility of completing the financial transaction after being authorized by the financial institution to execute the financial transaction. In an embodiment of the present invention, the merchant may assess the feasibility of the financial transaction based on financial risk, also referred to as fraud risk, associated with the consumer. For example, the merchant may assess high fraud risk if the authorization request sent to various financial institutions has already failed for the same financial transaction. In certain cases, the merchant may assess the feasibility based on the information about the consumer that the financial institution is unaware of at the time of authorizing the financial transaction. For example, the merchant might have transacted with the same consumer in the past with some other financial institution, and may have received poor feedback about the consumer.

The merchant may also utilize the information obtained from prior experience with the consumer by keeping a consumer track record. The method of the merchant performing a risk assessment and identifying financial transactions involving high fraud risk does not in any way limit the scope of the present invention. Further, the merchant may either indicate fraud risk of the overall financial transaction or of the high fraud risk product only, while sending the information to the financial institution.

In another embodiment of the present invention, the feasibility of the financial transaction is assessed based on stock limitations. For example, if the financial transaction includes a purchase order for 20 products of certain type, and the merchant either does not have or has a fewer number of products of that type in his stock, and/or finds it difficult to arrange for the remaining products by the delivery date, the financial transaction is not considered feasible by the merchant.

In yet another embodiment of the present invention, the merchant may assess the feasibility of the financial transaction based on the purchase order delivery conditions. For example, if the address for delivery is outside the range of the merchant, the merchant may consider the financial transaction as not feasible.

It may be understood that the feasibility assessment is typically performed after receiving an authorization from the financial institution for executing the financial transaction. However, it does not limit the feasibility assessment, which may be performed before receiving the authorization, or even before sending the request for authorization to the financial institution.

At step 206, the merchant processes the financial transaction based on the feasibility assessment. The processing may either result in the fulfillment or non-fulfillment of the purchase order depending on the feasibility assessment.

In accordance with an embodiment of the present invention, the merchant decides to fulfill or not to fulfill the purchase order. The merchant decision may be based, for example, on any of the already mentioned reasons. In case the merchant decides not to fulfill the purchase order, the merchant then rejects the financial transaction and no amount is credited from the consumer's account. However, in case the merchant decides to fulfill the purchase order since the financial transaction is assessed as feasible, the merchant completes the financial transaction and the purchase amount is credited from the consumer's account. The processing of the financial transaction can be performed either manually by the merchant or by using any automated method.

At step 208, the merchant electronically provides the financial institution with the details related to processing of the financial transaction, including the information related to the feasibility assessment of the financial transaction. The information related to the feasibility assessment of the financial transaction is based on the outcome of the feasibility assessment. This information may be stored by the financial institution for later use in processing future transactions. For example, if the merchant decides not to fulfill the purchase order, the merchant sends the information to the financial institution indicating that the financial transaction is declined. Further, the merchant may also inform the financial institution regarding an outcome of the feasibility assessment that defines the reason for the non-fulfillment of the purchase order, such as stock limitation, order delay, deadline restrictions, high fraud risk, and the like. However, if the merchant decides to fulfill the purchase order, the merchant may simply inform the financial institution that the purchase order has been fulfilled. In another embodiment of the present invention, the merchant may not send any information in case he decides to fulfill the purchase order. In this case, the financial institution is informed about the fulfillment of the financial transaction only when the merchant presents a submission record to the financial institution to serve as a proof for fulfillment of the financial transaction.

In an embodiment, the details related to the processing of the financial transaction are sent for each financial transaction every time a financial transaction is authorized by the merchant. In another embodiment, the merchant may decide to send the details in a batch mode. In this case, the merchant combines several financial transactions in a batch mode and sends the information regarding all purchase orders that are fulfilled and that are not fulfilled together using the same communication channel that was used for receiving authorizations. In the batch mode, the merchant may send the information as per the merchant's requirements, for example, on a daily basis or an hourly basis. Further, the merchant specifically indicates details about individual transactions that are declined and the outcome of corresponding feasibility assessments. The batch mode is merely a mode for providing convenience to the merchant and may be implemented based on an individual merchant's requirement without limiting the scope of the present invention.

The merchant may send the details to the financial institution over a secured internet communication platform or over any other wired or wireless communication platform. Typically, a landline phone with a web-phone, a cellular phone, a Personal Digital Assistant (PDA), a personal computer, a handheld device, a point of sale (POS) device, or the like may be used to transmit the details to the financial institution. The details may further be sent in the form of an SMS notification, an email notification, a voice signal or any other communication format.

In yet another embodiment of the present invention, the financial institution may add an acknowledgement option while sending the authorization to the merchant. The acknowledgement option is meant to gather information from the merchant regarding feasibility of the financial transaction and any other information related to the financial transaction that the financial institution is unaware of. The merchant may then simply click on the Yes/No option using a communication channel using any of the devices mentioned above, and inform the financial institution regarding fulfillment/non-fulfillment of the purchase order. For example, if the merchant selects the 'Yes' option, the action indicates fulfillment of the financial transaction and if the merchant selects the 'No' option, the action indicates non-fulfillment of the financial transaction.

The merchant, however, may also send other information along with the acknowledgement to indicate the details of the feasibility assessment. A separate option that may be called as a note option, comment option, or details option may be added for this purpose.

However, it must be understood that the merchant sends the details by using the same communication channel which is used by the financial institution while sending the authorization for the purchase order. For example, if the financial institution sends the authorization notification through the Internet platform, the merchant also responds through the Internet platform for sending the details regarding the processing of the financial transaction.

Embodiments of the present invention may be implemented for financial transactions involving internet orders, mail orders, and phone orders for placing the purchase order. However, it must be understood by a person ordinarily skilled in the art that the method of placing the purchase order must not limit the scope of the present invention. In other embodiments of the present invention, the consumer may physically place the purchase order with the merchant by being present at the merchant's store.

In accordance with various embodiments of the present invention, the details are sent by the merchant in real-time following the receipt of authorization decision from the financial institution. This enables the merchant to perform more validations with the consumer to avoid any risk of non-feasibility of the financial transactions. Therefore, the financial institution is aware of fulfillment/non-fulfillment of the financial transactions in real-time. Further, the real-time awareness better enables the financial institution to assess feasibility of future financial transactions based on additional information received from the merchant. The real-time awareness also provides the financial institution with an indication of the cause for the non-feasibility of the financial transaction, such as stock limitations, high fraud risk, and the like.

Moreover, the financial institution may also modify its methods for risk assessments to improve future financial transactions and avoid any fraud in the future. The financial institution can use the assessments to understand customers' behavioral patterns by identifying and classifying various types of fraud risks through real-time risk assessments. Hence, the financial institution can use this information to identify various levels and classes of risks for various types of consumers and use such information for the purpose of authorizations of the financial transactions in the future.

Fraud charge-backs on the merchant may also be reduced through improved fraud risk assessments by utilizing the additional information obtained from the merchant. Consequently, a stronger partnership is built between the merchant and the financial institution since the merchant expects fewer occurrences of fraud charge-backs from the financial institution. A fraud charge-back occurs when the financial institution does not reimburse the merchant for a particular transaction, or requests return of payment for a particular transaction, because a transaction allowed by the merchant is later found to be fraudulent.

Embodiments of the present invention have been described above in relation to financial transactions that involve purchase orders for products. However, it must be understood by a person ordinarily skilled in the art that the present invention can be easily extrapolated to purchase of services also.

IV. Example Implementation

Figure 3:
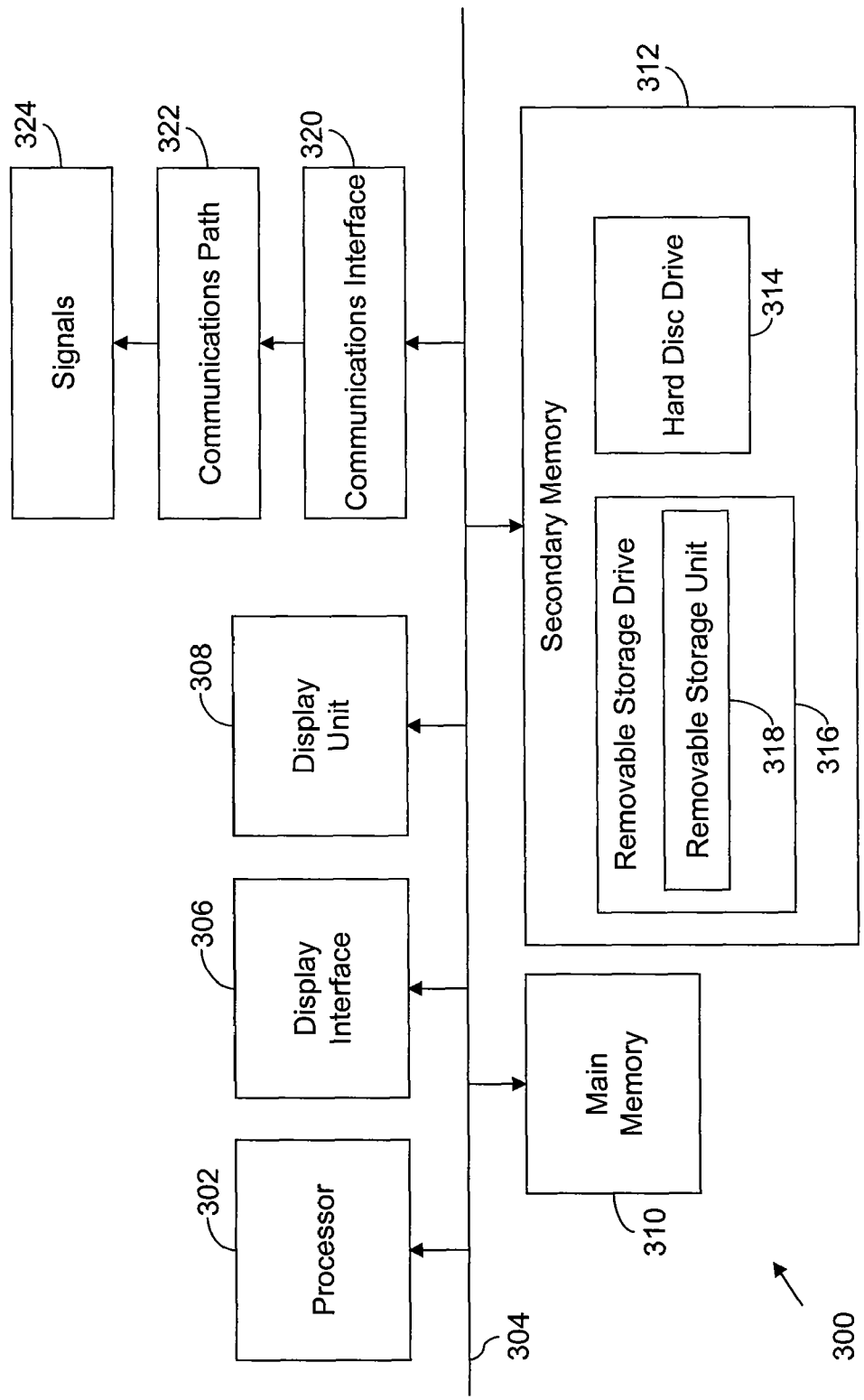
FIG. 3 is a block diagram of an exemplary computer system that may be used in accordance with an embodiment of the invention.

Embodiments of the present invention, e.g., system 100 and method 200 or any part(s) or function(s) thereof, may be implemented by using hardware, software or a combination thereof, and may be implemented in one or more computer systems or other processing systems. However, the manipulations performed are often referred to in terms, such as adding or comparing, which are commonly associated with the mental operations performed by a human operator. This capability of a human operator is unnecessary, or undesirable, in most cases, in any of the operations described herein, which form part of the present invention. On the contrary, the operations are machine operations. Useful machines for performing the operations of embodiments of the present invention include digital computers or similar devices. An example of a computer system 300 is shown in FIG. 3.

Computer system 300 includes one or more processors such as processor 302. Processor 302 is connected to a communication infrastructure 304, for example, a communication bus, a cross-over bar, and a network. Various software embodiments are described in terms of this exemplary computer system. After reading this description, it will become apparent to a person skilled in the relevant art(s) how the invention can be implemented by using other computer systems and/or architectures.

Computer system 300 may include a display interface 306 that forwards graphics, text, and other data received from communication infrastructure 304 (or from a frame buffer that is not shown) for display on a display unit 308.

Computer system 300 also includes a main memory 310, preferably a random access memory (RAM), and may also include a secondary memory 312. Secondary memory 312 may include, for example, a hard disk drive 314 and/or a removable storage drive 316 representing a floppy disk drive, a magnetic tape drive, an optical disk drive, etc. Removable storage drive 316 reads from and/or writes to a removable storage unit 318 in a well-known manner. Removable storage unit 318 represents a floppy disk, a magnetic tape, an optical disk, etc., which is read by and written to by removable storage drive 316. As will be appreciated, removable storage unit 318 includes a computer-usable storage medium with stored computer software and/or data.

In alternative embodiments, secondary memory 312 may include other similar devices, enabling computer programs or other instructions to be loaded into computer system 300. Such devices may include, for example, a removable storage unit and an interface. Examples of these devices may include a program cartridge and a cartridge interface such as those found in video game devices, a removable memory chip such as an erasable programmable read-only memory (EPROM), or a programmable read only memory (PROM)) and an associated socket, as well as other removable storage units and interfaces that enable software and data to be transferred from the removable storage unit to computer system 300.

Computer system 300 may also include a communications interface 320, which enables software and data to be transferred between computer system 300 and external devices. Examples of communications interface 320 may include a modem, a network interface such as an Ethernet card, a communications port, a Personal Computer Memory Card International Association (PCMCIA) slot, and card. Software and data transferred via communications interface 320 may be in the form of signals 324, which may be electronic, electromagnetic, optical or other signals that are capable of being received by communications interface 320. These signals 324 are provided to communications interface 320 via a communications path 322 (e.g., channel). This communications path 322 carries signals 324 and may be implemented by using a wire or cable, fiber optics, a telephone line, a cellular link, a radio frequency (RF) link, and other communication channels.

In this document, the terms 'computer program medium' and 'computer-readable medium' are used to generally refer to media such as removable storage drive 316, a hard disk installed in hard disk drive 314, and signals 324. These computer program products provide software to computer system 300. Embodiments of the invention are directed at such computer program products.

Computer programs, also referred to as computer control logic, are stored in main memory 310 and/or secondary memory 312. These computer programs may also be received via communications interface 320. Such computer programs, when executed, enable computer system 300 to perform the features of embodiments of the present invention, as discussed herein. In particular, the computer programs, when executed, enable processor 302 to perform the features of embodiments of the present invention. Accordingly, such computer programs act as the controllers of computer system 300.

In an embodiment where the invention is implemented by using software, the software may be stored in a computer program product and loaded into computer system 300 by using removable storage drive 316, hard disk drive 314 or communications interface 320. The control logic (software), when executed by processor 302, causes processor 302 to perform the functions of the invention, as described herein.

In another embodiment, the invention is implemented primarily in hardware, using, for example, hardware components such as application-specific integrated circuits (ASICs). The implementation of the hardware state machine, to perform the functions described herein, will be apparent to persons skilled in the relevant art(s).

In yet another embodiment, the invention is implemented by using a combination of both hardware and software.

V. Conclusion

While various embodiments of the present invention have been described above, it should be understood that they have been presented by way of example and not limitation. It will be apparent to persons skilled in the relevant art(s) that various changes in form and detail can be made therein, without departing from the spirit and scope of the present invention. Therefore, the present invention should not be limited by any of the exemplary embodiments described above, but should be defined only in accordance with the following claims and their equivalents.

In addition, it should be understood that the figures illustrated in the attachments, which highlight the functionality and advantages of the present invention, are presented for exemplary purposes only. The architecture of the present invention is sufficiently flexible and configurable, such that it may be utilized (and navigated) in ways other than that shown in the accompanying figures.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method comprising:
   dynamically determining, by a merchant computer system for sending a post-authorization message to a financial institution, a risk associated with executing a financial transaction in response to an authorization by the financial institution of the financial transaction, wherein the risk is based on at least one of: a financial risk, a consumer history, a consumer track record, a stock limitation, and a purchase order delivery condition; and
   generating, by the merchant computer system, the post-authorization message based upon the determining, wherein the post-authorization message includes information related to the risk associated with the executing the financial transaction.

2. The method according to claim 1, further comprising sending, by the merchant computer system, the post-authorization message to notify the financial institution that the financial transaction has not been fulfilled.

3. The method according to claim 1, further comprising sending, by the merchant computer system, the post-authorization message to notify the financial institution that the financial transaction has been fulfilled.

4. The method according to claim 1, further comprising receiving, by the merchant computer system, the authorization by way of a communication channel, and transmitting, by the merchant computer system, the post-authorization message by way of the communication channel.

5. The method according to claim 1, further comprising:
   accumulating, by the merchant computer system, a plurality of post-authorization messages from a plurality of financial transactions; and
   transmitting, by the merchant computer system, the accumulated post-authorization messages to the financial institution in a batch file.

6. A system comprising:
   a merchant processor for sending a post-authorization message to a financial institution,
   a tangible, non-transitory memory configured to communicate with the merchant processor, the tangible, non-transitory memory having instructions stored thereon that, in response to execution by the merchant processor, cause the merchant processor to perform operations comprising:
   dynamically determining, by the merchant processor, a risk associated with executing a financial transaction in response to an authorization by the financial institution of the financial transaction, wherein the risk is based on at least one of: a financial risk, a consumer history, a consumer track record, a stock limitation, and a purchase order delivery condition; and
   generating, by the merchant processor, the post-authorization message based upon the determining, wherein the post-authorization message includes information related to the risk associated with the executing the financial transaction.

7. The system according to claim 6, further comprising sending, by the merchant processor, the post-authorization message to notify the financial institution that the financial transaction has not been fulfilled.

8. The system according to claim 6, further comprising sending, by the merchant processor, the post-authorization message to notify the financial institution that the financial transaction has been fulfilled.

9. The system according to claim 6, further comprising transmitting, by the merchant processor, a plurality of post-authorization messages in a batch file.

10. An article of manufacture including a non-transitory, tangible computer readable storage medium having instructions stored thereon that, in response to execution by a merchant computer-based system for sending a post-authorization message to a financial institution, cause the merchant computer-based system to perform operations comprising:
    dynamically determining, by the merchant computer system, a risk associated with executing a financial transaction in response to an authorization by the financial institution of the financial transaction, wherein the risk is based on at least one of: a financial risk, a consumer history, a consumer track record, a stock limitation, and a purchase order delivery condition; and
    generating, by the merchant computer system, the post-authorization message based upon the determining, wherein the post-authorization message includes information related to the risk associated with the executing the financial transaction.

11. The article according to claim 10, further comprising sending, by the merchant computer system, the post-authorization message to notify the financial institution that the financial transaction has not been fulfilled.

12. The article according to claim 10, further comprising sending, by the merchant computer system, the post-authorization message to notify the financial institution that the financial transaction has been fulfilled.

13. The article according to claim 10, further comprising transmitting, by the merchant computer system, a plurality of post-authorization messages in a batch file.

* * * * *

UNITED STATES PATENT AND TRADEMARK OFFICE
CERTIFICATE OF CORRECTION

| | |
|---|---|
| PATENT NO. | : 8,214,292 B2 |
| APPLICATION NO. | : 12/416680 |
| DATED | : July 3, 2012 |
| INVENTOR(S) | : Chanderpreet Singh Duggal et al. |

It is certified that error appears in the above-identified patent and that said Letters Patent is hereby corrected as shown below:

In Column 10 Line 2, please delete "for sending" and insert therefor --configured to send--.

Signed and Sealed this
Fourteenth Day of August, 2012

David J. Kappos
*Director of the United States Patent and Trademark Office*